(12) United States Patent
Prins et al.

(10) Patent No.: US 6,473,492 B2
(45) Date of Patent: Oct. 29, 2002

(54) MULTI-FLUID ELEMENTS DEVICE WITH CONTROLLABLE FLUID LEVEL BY MEANS OF MATRIX ADDRESSING

(75) Inventors: Menno Willem Jose Prins, Eindhoven (NL); Edward Willem Albert Young, Leuven (BE); Jeroen Van Velzen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/008,215

(22) Filed: Nov. 8, 2001

(65) Prior Publication Data

US 2002/0080920 A1 Jun. 27, 2002

(30) Foreign Application Priority Data

Nov. 9, 2000 (EP) .............................................. 00203952

(51) Int. Cl.[7] ................................................. G21K 3/00
(52) U.S. Cl. ........................................ 378/158; 378/156
(58) Field of Search .................................. 378/156–159

(56) References Cited

U.S. PATENT DOCUMENTS 5,666,396 A * 9/1997 Lenders et al. ............. 378/156

\* cited by examiner

Primary Examiner—Craig E. Church
(74) Attorney, Agent, or Firm—John Vodopia

(57) ABSTRACT

Fluid element device including fluid elements arranged in a matrix configuration having rows and columns with the level of fluid in each fluid element being controllable by electric force. The fluid elements include capillary tubes having electrode segments electrically insulated from one another such that each segments is receivable of a different voltage. A first voltage delivery circuit applies voltage to selected fluid elements in one or more rows of fluid elements and a second voltage delivery circuit applies voltage to selected fluid elements in one or more columns of fluid elements. The fluid level rises in the selected fluid elements to which voltage is applied by both the first and second voltage delivery circuits. The capillary tubes are structured and arranged such that the level of fluid in the selected elements can be retained independent of the application of voltage by the first and second voltage delivery circuits.

20 Claims, 4 Drawing Sheets

US 6,473,492 B2

MULTI-FLUID ELEMENTS DEVICE WITH CONTROLLABLE FLUID LEVEL BY MEANS OF MATRIX ADDRESSING

FIELD OF THE INVENTION

The present invention relates to a device comprising a plurality of fluid elements arranged in a matrix configuration, the level of fluid in each element being controllable by means of an electric force, which device is further provided with:

first means for applying an electric force to a number of selected elements in one or more of the rows of fluid elements;

second means for applying an electric force to a number of selected elements in one or more of the columns of fluid elements;

such that the fluid level rises in the selected elements to which an electric force is applied by both the first means and the second means; and memory means for retaining the risen level in the selected elements.

DESCRIPTION OF RELATED ART

Such a device is known from the international patent application WO 98/51509, which particularly refers to the delivery of fluids to a receptor, e.g. delivery of pigments to a printing media.

The known device uses matrix addressing to control the level of fluid in the fluid elements thereby advantageously reducing the number of drivers necessary to set the fluid level in the different elements.

OBJECTS AND SUMMARY OF THE INVENTION

The invention aims at providing a device of the type described above, which is particularly suited for manipulating the level of fluid in the fluid elements in a precise way without the need for extra components.

The device according to the invention is characterized in that the fluid elements comprise capillary tubes which are arranged such that the level of fluid is controllable while exercising a threshold like behaviour.

By designing the capillary tubes such that the physical characteristics thereof induce the threshold like behavior extra components, such as transistors or diodes, become redundant. This greatly reduces the size of the device according to the invention, which is an important advantage in the relevant technical fields.

According to a first preferred embodiment of the device according to the invention the capillary tubes comprise electrodes which are arranged inside the capillary tubes. Preferably the electrodes comprise a coating layer of an electrically conducting material.

It is noted that in U.S. Pat. No. 5,666,396 by the same applicant an X-ray examination device is described which is provided with an X-ray filter comprising a matrix of capillary tubes provided with electrodes comprising a coating layer of an electrically conducting material. The level of X-ray absorbing fluid inside the capillary tubes is controllable by means of application of an electric force to a number of selected capillary tubes. Thin film transistors are used to induce a threshold like behaviour for the fluid rise inside the capillary tubes, which is what the invention aims to overcome.

According to a second preferred embodiment of the device according to the invention the electrodes are divided into segments in longitudinal direction of the capillary tubes. In addition or as an alternative thereto the electrodes are divided into segments in transverse direction of the capillary tubes. Dividing the electrodes into segments thereby introducing a gap is an elegant construction which inherently induces the desired threshold like behaviour for the fluid rise. Preferably one or more of the electrode segments are coupled to the first means, leading to the so called 'liquid/in-capillary electrode embodiment. According to an alternative embodiment one or more of the remaining electrode segments are coupled to the second means, leading to the so called 'in-capillary/in-capillary' electrode embodiment.

According to a still further preferred embodiment one or more of the electrode segments are coupled to the memory means. A memory effect can be obtained by adding an extra electrode to a capillary tube. In conformance with the embodiments described above an electrode segment can serve as the extra electrode.

The invention also refers to an X-ray filter comprising a device according to the invention, wherein the capillary tubes are filled with an X-ray absorbing fluid.

Furthermore the invention refers to an X-ray examination device comprising an X-ray filter according to the invention.

The invention also refers to a microfluidic chip comprising a device according to the invention. Microfluidic chips as such are known from a publication in SCIENCE Vol 282, p. 399 and comprise a system of capillary channels, wherein, for example, a reactive is being transported. These microfluidic chips are applied in the field of biochemistry, for example to perform a DNA sequencing. Microfluidic chips can be also applied in the field of chemistry, for example for the purpose of chemical analysis.

BRIEF DESCRIPTION OF THE DRAWINGS

The invention will be further explained by means of the attached drawings, in which.

DETAILED DESCRIPTION OF THE INVENTION

Figure 1:
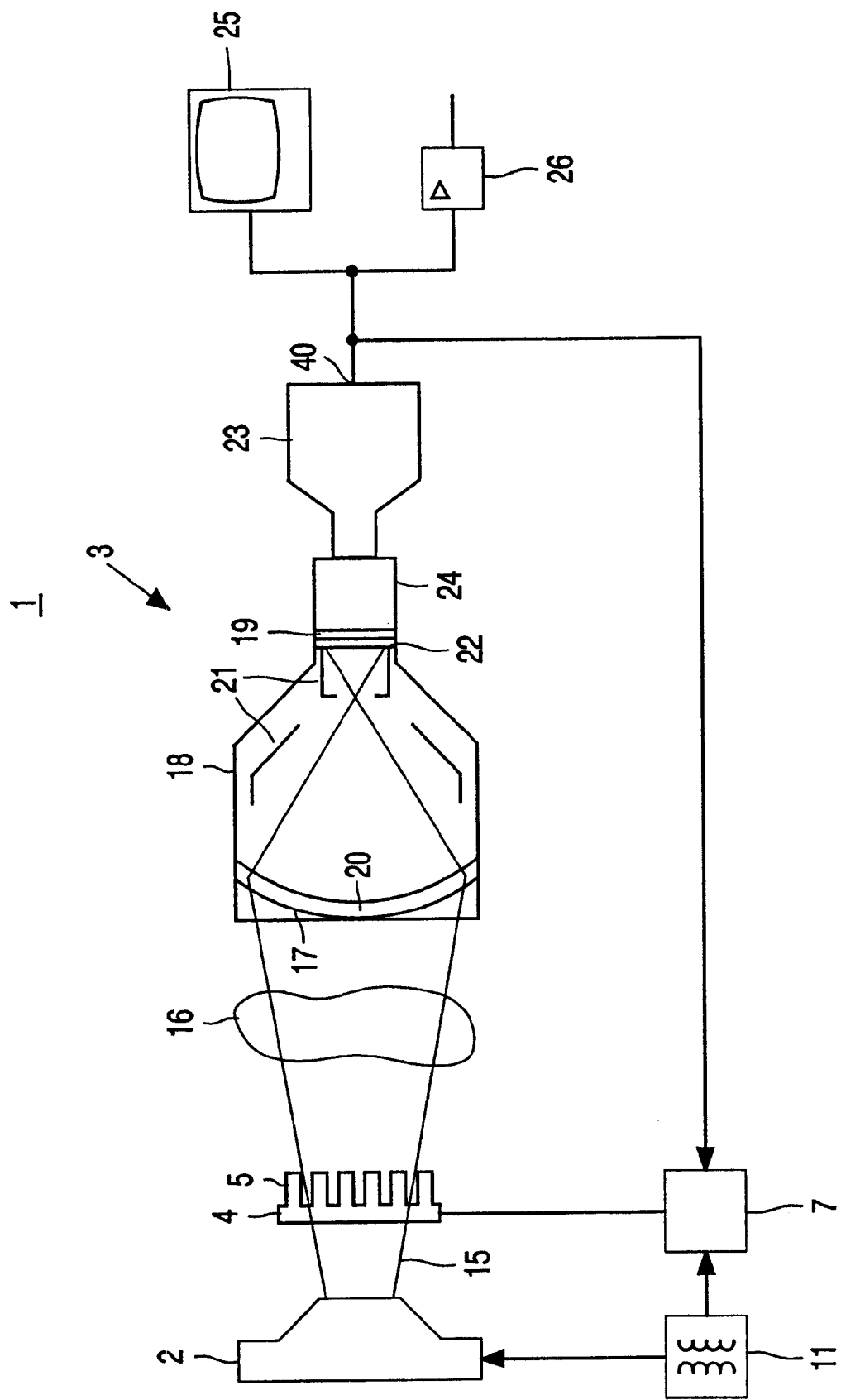
FIG. 1 shows a diagrammatic representation of an X-ray examination device provided with an X-ray filter comprising a device according to the invention

FIG. 1 shows diagrammatically an example of an X-ray examination apparatus 1 in which the present invention can be implemented. The X-ray source 2 emits an X-ray beam 15 for irradiating an object 16. Due to differences in X-ray absorption within the object 16, for example a patient to be radiologically examined, an X-ray image is formed on an X-ray sensitive surface 17 of the X-ray detector 3, which is arranged opposite the X-ray source. The X-ray detector 3 of the present embodiment is formed by an image intensifier pick-up chain which includes an X-ray image intensifier 18 for converting the X-ray image into an optical image on an exit window 19 and a video camera 23 for picking up the optical image. The entrance screen 20 acts as the X-ray sensitive surface of the X-ray image intensifier which converts X-rays into an electron beam which is imaged on the exit window by means of an electron optical system 21. The incident electrons generate the optical image on a phosphor layer 22 of the exit window 19. The video camera 23 is coupled to the X-ray image intensifier 18 by way of an optical coupling 24, for example a lens system or a fiber-optical coupling. The video camera 23 extracts an electronic image signal from the optical image, which signal is applied to a monitor 25 for the display of the image information in the X-ray image. The electronic image signal may also be applied to an image processing unit 26 for further processing.

Between the X-ray source 2 and the object 16 there is arranged the X-ray filter 4 for local attenuation of the X-ray beam. The X-ray filter 4 comprises a large number of filter elements 5 in the form of capillary tubes whose X-ray absorptivity can be adjusted by application of an electric voltage, referred to hereinafter as adjusting voltage, to the inner side of the capillary tubes by means of the adjusting unit 7.

Figure 2:
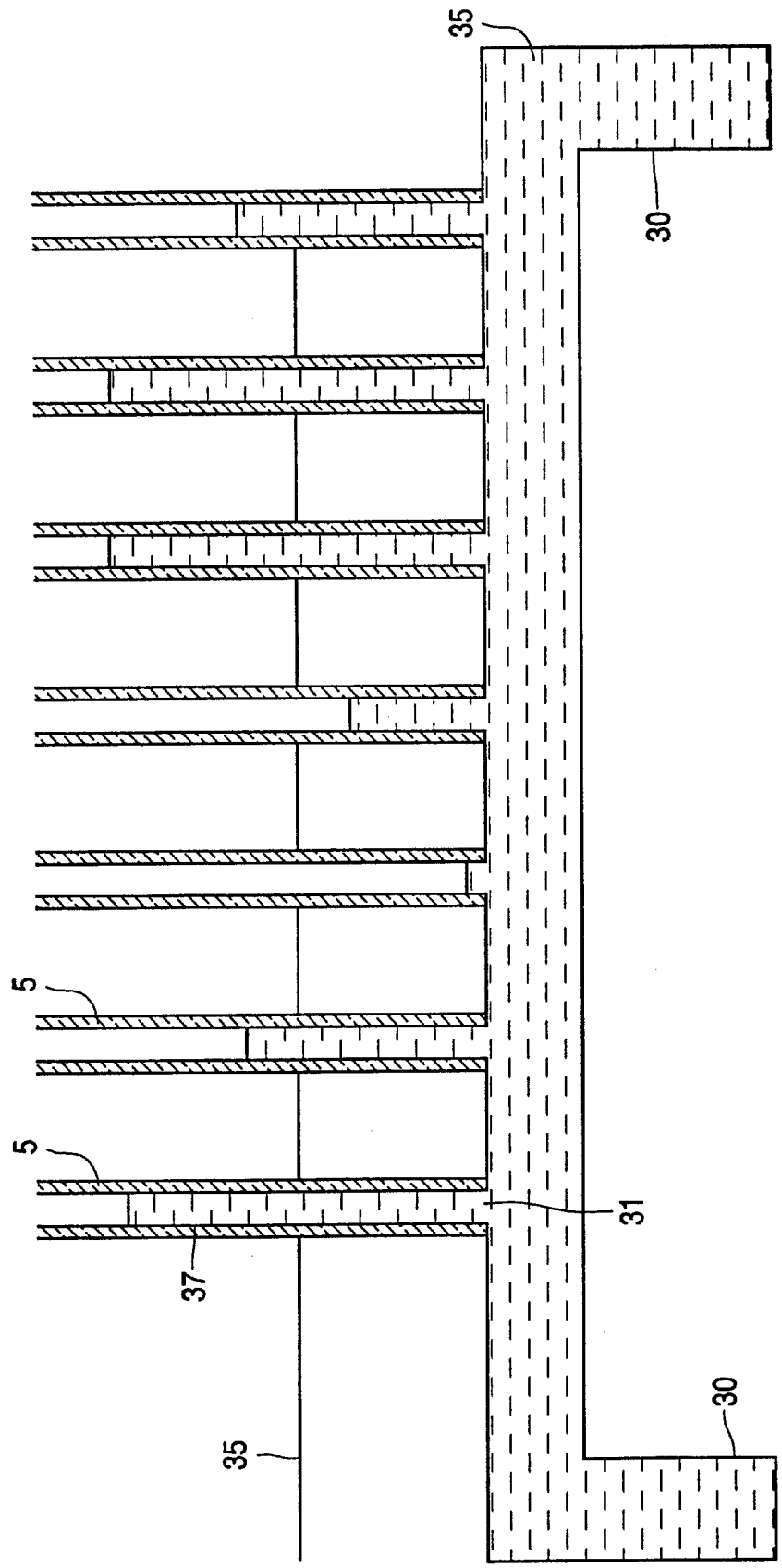
FIG. 2 shows a side elevation of the X-ray filter of the X-ray examination device shown in FIG. 1.

FIG. 2 is a side elevation of an X-ray filter 4 of the X-ray examination apparatus of FIG. 1. The Figure shows seven capillary tubes by way of example, but a practical embodiment of an X-ray filter 4 of an X-ray examination apparatus in accordance with the invention may comprise a large number of capillary tubes, for example 16384 tubes in a 128-128 matrix arrangement. Each of the capillary tubes 5 communicates with the X-ray absorbing liquid 6 via an end 31. The inner side of the capillary tubes is covered by an electrically conductive layer 37, for example of gold or platinum, which layer 37 is coupled to a voltage line 35.

The adhesion of the X-ray absorbing liquid to the inner side of the capillary tubes can be adjusted by means of an electric voltage applied to an electrically conductive layer 37 on the inner side of the capillary tubes 5. One end of the capillary tubes communicates with a reservoir 30 for an X-ray absorbing liquid. The capillary tubes are filled with a given quantity of X-ray absorbing liquid as a function of the electric voltage applied to the individual tubes. Because the capillary tubes extend approximately parallel to the X-ray beam, the X-ray absorptivity of the individual capillary tubes is dependent on the relative quantity of X-ray absorbing liquid in such a capillary tube. The electric adjusting voltage applied to the individual filter elements is adjusted by means of the adjusting unit 7, for example on the basis of brightness values in the X-ray image and/or the setting of the X-ray source 2. To this end, the adjusting unit is coupled to the output terminal 40 of the video camera and to the power supply 11 of the X-ray source 2. The construction of an X-ray filter 4 of this kind and the composition of the X-ray absorbing liquid are described in detail in the International Patent Application No. IB 95/00874 and in U.S. Pat. No. 5,666,396, which are both incorporated herein by reference.

The height of the fluid level inside the capillary tubes is influenced by the electrocapillary pressure, also called electrowetting. The electrocapillary pressure p behaves as $p = \text{const} \cdot V^2$, with V the electrical potential applied between an in-capillary electrode (37 in FIG. 2) and the conducting liquid (6 in FIG. 2). The height of the fluid level inside the capillary tubes is further determined by the repelling force of the capillary tube walls and the externally applied hydrostatic pressure. In this respect it is noted that use is made of watery solutions and hydrophobic materials. The fluid level in the capillary tubes is a result of the balance between said three forces of which the electrocapillary pressure p is actively used to set the fluid level at a desired height.

Dynamic measurements show that the switching takes place in 0.1–1 second (speed 1–10 cm/s, electrode length 1 cm).

In an X-ray filter the liquid level in every capillary has to be individually controllable. If every capillary is connected to an individual wire, the number of required electronic control elements scales with $N^2$. A well-know method to reduce the number of control elements to a number of the order N, is by matrix-addressing. Matrix addressing means that rows (indexed i, i∈{1 ... N}, voltage $V_i$) are activated one-by-one while the programming signals are placed on column wires (indexed j, j∈{1 ... N}, voltage $V_j$).

In order to apply matrix addressing in an X-ray filter an electrical matrix structure is needed in every capillary tube, i.e. every capillary tube (i, j) needs to be connected to voltages $V_i$ and $V_j$. Hereinafter three different examples of capillary tubes according to the invention are shown.

Figure 3:
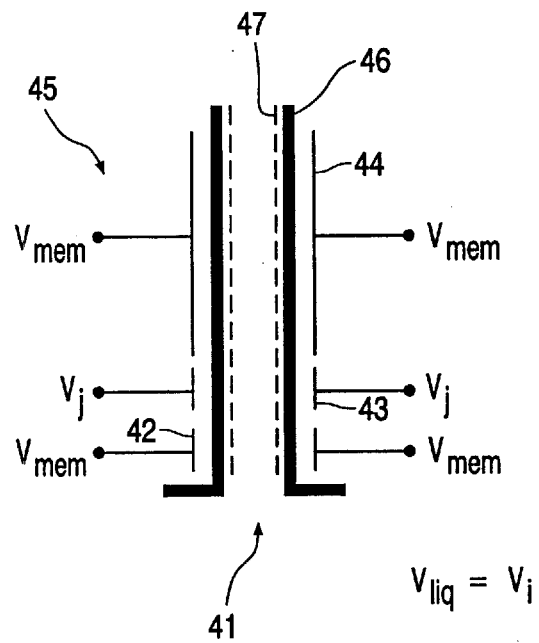
FIG. 3 shows a cross sectional view of a first embodiment of a capillary tube of a device according to the invention.

FIG. 3 shows a cross sectional view of a first embodiment of capillary tube 45 of a device according to the invention. Capillary tube 45 comprises an electrode formed by a conducting layer, an insulator 46 and a hydrophobic coating 47. The electrode is divided into three segments 42, 43 and 44 in longitudinal direction of the tube. The segments are mutually electrically insulated and different voltages are applied thereto. A voltage of $V_{mem}$ is applied to the lowest segment 42 by means of the row connection. A voltage of $V_j$ is applied to the middle segment 43 by means of the column connection. A voltage of $V_{mem}$ is applied to the highest segment 44. A voltage $V_i$ is applied to the liquid which acts as an electrode. This embodiment is therefore also referred to as the liquid/in-capillary electrode embodiment.

The segmentation of the data-electrode introduces a gap between the segments 42 and 43. In order for the liquid to rise over the above mentioned gap a threshold voltage should be applied to the data-electrode. Only for a large enough magnitude of $V_i - V_j$ the liquid will jump across the gap and rise above it.

The gap size (i.e. the distance between the segments of the data-electrode) as well as the gap geometry determine the threshold-behavior. An example of a gap geometry that reduces the required threshold voltage is shown schematically in FIG. 6, where two electrode segments are indented in the direction of the liquid rise.

In a similar fashion a local discontinuity of geometry (such as a local shape change, local opening-up and/or constriction of the capillary), of insulator properties (such as thickness or dielectric constant) or of hydrophobicity introduces a nonlinear behavior of liquid level versus applied voltage. The structuring of the metallic electrodes, insulator thickness or hydrophobic coating can be achieved in a filter that is composed of semi-planar plates or of foils.

Figure 4:
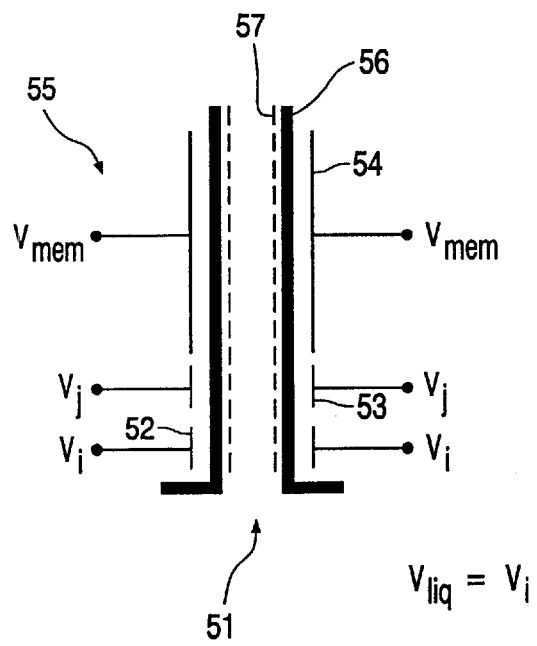
FIG. 4 shows a cross sectional view of a second embodiment of a capillary tube of a device according to the invention.

FIG. 4 shows a cross sectional view of a second embodiment of a capillary tube 55 of a device according to the invention. This embodiment is referred to as the in-capillary/in-capillary electrode embodiment.

Capillary tube 55 comprises an electrode formed by a conducting layer, an insulator 56 and a hydrophobic coating 57. The electrode is divided into three segments 52, 53 and 54 in longitudinal direction of the tube. The segments are mutually electrically insulated and different voltages are applied thereto. A voltage of $V_i$ is applied to the lowest segment 52 by means of the row connection. A voltage of $V_j$ is applied to the middle segment 53 by means of the column connection. A voltage of $V_{mem}$ is applied to the highest segment 54. A voltage $V_{liq}$ with approximately zero value is applied to the liquid.

At the mouth 51 of the capillary the electrodes 52 and 53 act as a valve between the supply channel and the bulk of the capillary thus introducing a threshold-like behavior. Only when a voltage with a predetermined value is applied to electrode 52 as well as to electrode 53 the liquid fills the capillary. The liquid does not rise if only one of the electrodes is activated.

Due to the limited velocity of liquid movement (speed 1–10 cm/s), the meniscus senses a time-averaged electro-capillary pressure. To avoid that programmed rows loose their pattern in the time that other rows are being programmed, a memory function has to be added to every capillary tube. Such a memory function can be achieved with an extra electrode in the capillaries. This electrode can be shared by more than one capillary as is the case with $V_{mem}$ in FIG. 3.

The value of $V_{mem}$ is chosen such that the capillary tube 55 remains filled once the liquid has risen, independent of the value of voltages $V_i$ and $V_j$. This is referred to as the 'memory effect'. The memory effect is advantageous because it allows for the sequential addressing of several rows. In order to empty the filled capillaries, a zero voltage should be applied to electrodes 52, 53 and 54 resulting in a reset of the capillaries. After resetting the capillaries can be reprogrammed. Preferably every row of capillaries has a separate $V_{mem}$ connection allowing the resetting to occur in a row-wise fashion.

Figure 5:
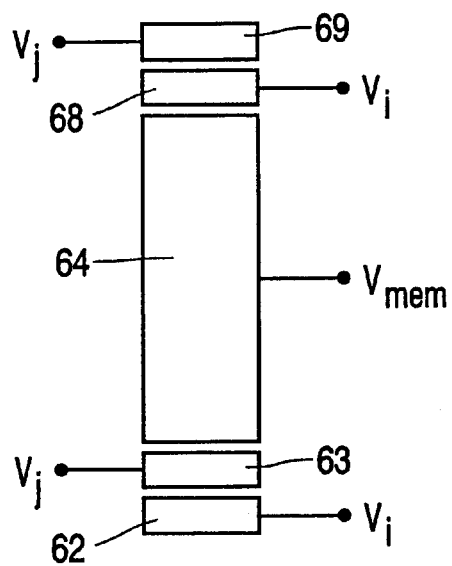
FIG. 5 shows a schematic view of a third embodiment of a capillary tube of a device according to the invention.

FIG. 5 shows a cross sectional view of a third embodiment of a capillary tube of a device according to the invention. This embodiment is also referred to as the improved in-capillary/in-capillary electrode embodiment.

FIG. 5 shows a preferred embodiment of an electrode architecture that allows filling and emptying of a single capillary tube. Every capillary tube is provided with an electrode sequence 62, 63, 64, 68, 69, whereby a voltage $V_i$ is applied to electrode segments 62 and 69, a voltage $V_j$ is applied to electrode segments 63 and 68 and a voltage $V_{mem}$ is applied to electrode segment 64 so that the voltage sequence is $V_i/V_j/V_{mem}/V_i/V_j$. $V_{mem}$ indicates the voltage applied to the memory electrode, electrode segment 64 in this case. The conducting fluid is supplied from below. In the examples given below, V=0 means that no potential is applied, so that the electrode is being de-wetted. V=1 means that a high potential is applied (e.g. V>200 V), so that the electrode is being wetted.

EXAMPLE 1

Suppose that all capillary tubes are empty and we want to fill only one capillary tube (i=n, j=m).
We can do this by applying for example:
   $V_i$=1 for all i, $V_j$=0 for all j, and then
   $V_{mem}$=1, $V_i$=1 for all i, $V_j$=0 for all j, and then
   $V_{mem}$=1, $V_i$=0 for all i, $V_j$=0 for all j, and then
   $V_{mem}$=1, $V_{i=n}$=1, $V_{i\neq n}$=0, $V_{j=m}$=1, $V_{j\neq m}$=0, (the capillary fills) and then
   $V_{mem}$=1, $V_i$=0 for all i, $V_j$=0 for all j.

EXAMPLE 2

Suppose that all capillary tubes are full and we want to empty only one capillary tube (i=n, j=m).

We can do this by applying for example:
   $V_i$=1 for all i, $V_j$=0 for all j, and then
   $V_{mem}$=0, $V_i$=1 for all i, $V_j$=0 for all j, and then
   $V_{mem}$=0, $V_i$=1 for all i, $V_j$=1 for all j, and then
   $V_{mem}$=0, $V_{i=n}$=0, $V_{i\neq n}$=1, $V_j$=1 for all j, and then
   $V_{mem}$=0, $V_{i=n}$=0, $V_{i\neq n}$=1, $V_{j=m}$=0, $V_{j\neq m}$=1, (the capillary empties) and then
   $V_{mem}$=0, $V_i$=1 for all i, $V_j$=0 for all j, and then
   $V_{mem}$=1, $V_i$=1 for all i, $V_j$=0 for all j, and then
   $V_{mem}$=1, $V_i$=0 for all i, $V_j$=0 for all j.

It is noted that grey-scale programming is possible when the architecture of FIG. 5 is repeated several times in a capillary tube.

Figure 6:
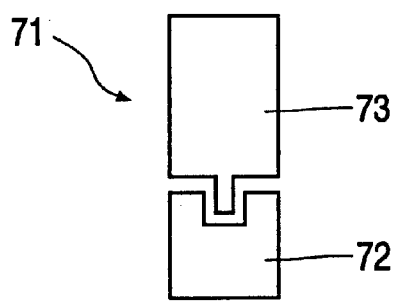
FIG. 6 shows a schematic view of a fourth embodiment of a capillary tube of a device according to the invention.

FIG. 6 schematically shows an embodiment of a capillary tube 71 according to the invention comprising two electrode segments 72 and 73, which are indented in the direction of the liquid rise. This gap geometry reduces the required threshold voltage. It will be understood that the indented parts can have a variety of shapes apart from the rectangular shape that is shown.

It will be clear for a person skilled in the art that in the matrix structures described above the functions of rows and columns are interchangeable.

Summarizing the invention provides the insight that in a device as described above the construction of the fluid elements can be designed such that it induces the desired threshold like behavior of the fluid rise without the necessity of extra components.

The invention is of course not limited to the described or shown embodiment(s), but generally extends to any embodiment, which falls within the scope of the appended claims as seen in light of the foregoing description and drawings.

What is claimed is:

1. A fluid element device comprising:
   a plurality of fluid elements arranged in a matrix configuration having rows and columns, the level of fluid in each of said fluid elements being controllable by means of an electric force, said fluid elements comprising capillary tubes, each of said capillary tubes comprising a plurality of electrode segments electrically insulated from one another such that each of said segments is receivable of a different electric voltage;
   first means for applying an electric force to a number of selected fluid elements in one or more of said rows of fluid elements; and
   second means for applying an electric force to a number of selected fluid elements in one or more of said columns of fluid elements such that the fluid level rises in the selected fluid elements to which an electric force is applied by both said first means and said second means.

2. The device according to claim 1, wherein said electrode segments of each of said capillary tubes are arranged inside said capillary tubes.

3. The device according to claim 1, wherein said electrode segments each comprise a coating layer of an electrically conducting material.

4. The device according to claim 1, wherein said electrode segments of at least one of said capillary tubes extend in a longitudinal direction of said capillary tube.

5. The device according to claim 1, wherein said electrode segments of at least one of said capillary tubes extend in a transverse direction of said capillary tube.

6. The device according to claim 1, wherein at least one of said electrode segments is coupled to said first means.

7. The device according to claim 1, wherein at least one of said electrode segments is coupled to said second means.

8. The device according to claim 1, further comprising third means for applying an electric force to at least one of said electrode segments such that when the level of fluid in said capillary tube reaches said electrode segment, application of a voltage of a predetermined value to said electrode segment by said third means will maintain the level of fluid in said capillary tube independent of the application of an electric force by said first and second means to thereby provide said capillary tube with a memory effect with said electrode segment constituting a memory electrode.

9. An X-ray filter comprising a device according to claim 1, wherein said capillary tubes are at least partially filled with an X-ray absorbing fluid.

10. The device according to claim 1, wherein said plurality of electrode segments in at least one of said capillary tubes comprises sequentially arranged first, second and third electrode segments.

11. The device according to claim 10, wherein said first electrode segment is coupled to said first means and said second electrode segment is coupled to said second means, said first and second means being controllable such that upon application of voltages of predetermined values to both said first and second electrode segments by said first and second means, the fluid in said capillary tube will rise above said first and second electrode segments.

12. The device according to claim 11, further comprising third means for applying an electric force to said third electrode segment such that when the level of fluid in said capillary tube reaches said third electrode segment, application of a voltage of a predetermined value to said third electrode segment will maintain the level of fluid in said capillary tube independent of an electric force applied by said first and second means to thereby provide said capillary tube with a memory effect with said third electrode segment constituting a memory electrode.

13. The device according to claim 10, wherein said second electrode segment is coupled to said first or second means, whereby upon application of a voltage to the fluid in said capillary tube above a threshold relative to the voltage applied to said second electrode segment, the fluid will rise above a gap between said first and second electrode segments.

14. The device according to claim 13, further comprising third means for applying an electric force to said third electrode segment such that when the level of fluid in said capillary tube reaches said third electrode segment, application of a voltage of a predetermined value to said third electrode segment will maintain the level of fluid in said capillary tube independent of the application of an electric force by said first and second means to thereby provide said capillary tube with a memory effect with said third electrode segment constituting a memory electrode.

15. The device according to claim 1, wherein said electrode segments are spaced from one another to define a gap between each adjacent pair of electrode segments.

16. The device according to claim 1, wherein said plurality of electrode segments comprises at least first and second electrode segments, said first electrode segment being coupled to said first means and said second electrode segment being coupled to said second means.

17. An X-ray examination device comprising:

an X-ray source;

an X-ray detector spaced from said X-ray source; and an X-ray filter arranged between said X-ray source and said X-ray detector, said X-ray filter comprising a reservoir for storing X-ray absorbing fluid;

a plurality of fluid elements arranged in a matrix configuration having rows and columns, said fluid elements being in fluid communication with said reservoir, the level of fluid in each of said fluid elements being controllable by means of an electric force, said fluid elements comprising capillary tubes, each of said capillary tubes comprising a plurality of electrode segments electrically insulated from one another such that each of said segments is receivable of a different electric voltage;

first means for applying an electric force to a number of selected fluid elements in one or more of said rows of fluid elements; and second means for applying an electric force to a number of selected fluid elements in one or more of said columns of fluid elements such that the fluid level rises in the selected fluid elements to which an electric force is applied by both said first means and said second means.

18. A fluid element device, comprising:

a plurality of fluid elements arranged in a matrix configuration having rows and columns, the level of fluid in each of said fluid elements being controllable by means of an electric force;

first means for applying an electric force to a number of selected fluid elements in one or more of said rows of fluid elements;

second means for applying an electric force to a number of selected fluid elements in one or more of said columns of fluid elements such that the fluid level rises in the selected fluid elements to which an electric force is applied by both said first means and said second means; and fluid level retention means for maintaining the level of fluid in the selected elements, after the fluid has risen by the application of an electric force applied by both said first means and said second means, at the elevated level independent of the application of an electric force by said first means and said second means.

19. The device according to claim 18, wherein said fluid elements comprise capillary tubes, each of said capillary tubes comprising a plurality of electrode segments electrically insulated from one another such that each of said segments is receivable of a different electric voltage.

20. The device according to claim 19, wherein said fluid level retention means comprise one of said electrode segments and third means for applying an electric force to said one of said electrode segments.

* * * * *